United States Patent
Schneider et al.

(10) Patent No.: US 7,461,091 B2
(45) Date of Patent: Dec. 2, 2008

(54) CONTROLLING DATA TRANSITION BETWEEN BUSINESS PROCESSES IN A COMPUTER APPLICATION

(75) Inventors: Andreas Schneider, Bobenheim-Roxheim (DE); Igor Kalenderian, Heidelberg (DE); Renzo Colle, Rastatt (DE)

(73) Assignee: SAP Aktiengesellschaft, Waldorf (DE)

( * ) Notice: Subject to any disclaimer, the term of this patent is extended or adjusted under 35 U.S.C. 154(b) by 420 days.

(21) Appl. No.: 11/148,245

(22) Filed: Jun. 9, 2005

(65) Prior Publication Data

US 2006/0282448 A1    Dec. 14, 2006

(51) Int. Cl.
G06F 7/00 (2006.01)
G06F 17/00 (2006.01)
G06F 17/30 (2006.01)
G06F 15/16 (2006.01)

(52) U.S. Cl. ............... 707/104.1; 707/4; 707/6; 707/9; 709/219

(58) Field of Classification Search ............ 707/4, 707/6, 104.1, 9; 709/219; 715/523
See application file for complete search history.

(56) References Cited

U.S. PATENT DOCUMENTS

| | | | |
|---|---|---|---|
| 4,714,995 A | 12/1987 | Materna et al. | |
| 5,179,698 A * | 1/1993 | Bachman et al. | 707/4 |
| 5,216,592 A | 6/1993 | Mann et al. | |
| 5,315,709 A * | 5/1994 | Alston et al. | 707/6 |
| 5,634,127 A | 5/1997 | Cloud et al. | |
| 5,701,423 A | 12/1997 | Crozier | |
| 5,721,912 A | 2/1998 | Stepczyk et al. | |
| 5,734,837 A | 3/1998 | Flores et al. | |
| 5,778,373 A | 7/1998 | Levy et al. | |
| 5,870,605 A | 2/1999 | Bracho et al. | |
| 5,870,765 A | 2/1999 | Bauer et al. | |
| 5,873,096 A | 2/1999 | Lim et al. | |
| 6,052,684 A | 4/2000 | Du | |

(Continued)

FOREIGN PATENT DOCUMENTS

EP    0 592 045    4/1994

(Continued)

OTHER PUBLICATIONS www.metamatrix.com/datasheets/metabasemodeler.pdf;
"Metamatrix, Metabase Modeler—Metadata Modeling Environment"; Apr. 15, 2003; 2 pages.*

(Continued)

*Primary Examiner*—Mohammad Ali
*Assistant Examiner*—Dennis Truong
(74) *Attorney, Agent, or Firm*—Fish & Richardson P.C.

(57) ABSTRACT

Techniques are described to enable a user to define data-transition rules that control how a handover component of a computer application transforms business objects of one type to business objects of another type. The handover component is logically situated between a preceding business process that uses a preceding type of business object and a second business process that uses a second type of business object. Based on the user-defined data-transition rules, the handover component performs a split/merge process that determines the succeeding business objects to be generated based on the preceding business objects received from the preceding business process and then generates the succeeding business objects based on the received preceding business objects and the user-defined data-transition rules.

26 Claims, 7 Drawing Sheets

U.S. PATENT DOCUMENTS

| | | | |
|---|---|---|---|
| 6,226,649 | B1 | 5/2001 | Bodamer et al. |
| 6,256,676 | B1 | 7/2001 | Taylor et al. |
| 6,324,492 | B1 | 11/2001 | Rowe |
| 6,339,795 | B1 | 1/2002 | Narurkar et al. |
| 6,381,601 | B1 | 4/2002 | Fujiwara et al. |
| 6,446,092 | B1 | 9/2002 | Sutter |
| 6,507,856 | B1 | 1/2003 | Chen et al. |
| 6,571,246 | B1 | 5/2003 | Anderson et al. |
| 6,748,402 | B1 | 6/2004 | Reeves et al. |
| 6,817,008 | B2 | 11/2004 | Ledford et al. |
| 6,941,511 | B1 * | 9/2005 | Hind et al. ............ 715/523 |
| 6,961,760 | B2 * | 11/2005 | Li et al. ............ 709/219 |
| 2002/0095653 | A1 | 7/2002 | Parr et al. |
| 2002/0107752 | A1 | 8/2002 | Rivera et al. |
| 2002/0194196 | A1 * | 12/2002 | Weinberg et al. ...... 707/104.1 |
| 2005/0240592 | A1 * | 10/2005 | Mamou et al. ............ 707/9 |

FOREIGN PATENT DOCUMENTS

| | | |
|---|---|---|
| EP | 1 217 515 | 6/2002 |
| WO | WO 93/04436 | 3/1993 |
| WO | WO 00/79408 | 12/2000 |
| WO | WO 01/27806 | 4/2001 |
| WO | WO 02/091240 | 11/2002 |

OTHER PUBLICATIONS http://www.redbooks.ibm.com/redbooks/pdfs/sg246916.pdf; Lee Gavin, Gangadhara Rao Akana, Axel Angeli, Sreedhar Reddy Bhunirddy, Peter Gersak, Nizam Ishmael, Hari Kamar Nagumalla, Viral Ved: IBM Redbooks "A B2B Solution using WebSphere Business Integration V4.1 and WebSphere Business Connection V1.1"; Aug. 2003.* http://www.metamatrix.com/products/modeler.html; "Metabase Modeler: Metamatrix Creating Possibilities"; pp. 1-3; (Feb. 21, 2005).

www.metamatrix.com; "Metamatrix, Metabase Modeler—Metadata Modeling Environment"; 2 pages.

http://www-306.ibm,com/software/awdtools/developer/datamodeler/features; "IBM Rational Rose Data Modeler"; pp. 1-2; (Feb. 21, 2005).

www.filenet.com; "FileNet Business Process Manager & Rules Engine Integration"; pp. 1-7; (Aug. 2003).

Urban, S.D., et al., Interconnection of Distributed Components: An Overview of Current Middleware Solutions, Journal of Computing and Information Science in Engineering, vol. 1, Mar. 2001, pp. 23-31.

Gray et al., The Dangers of Replication and a Solution, ACM SIGMOD Record, Jun. 1996, pp. 173-182.

Huston et al., Disconnected Operation for AFS, Proceedings of the USENIX Mobile and Location-Independent Computing Symposium , Cambridge, MA, Aug. 2-3, 1993, USENIX Association, pp. 1-10.

* cited by examiner

CONTROLLING DATA TRANSITION BETWEEN BUSINESS PROCESSES IN A COMPUTER APPLICATION

TECHNICAL FIELD

This description relates to techniques for defining and controlling transaction processing performed by computer systems.

BACKGROUND

Enterprise information technology (IT) systems often are used to manage and process business data. To do so, a business enterprise may use various application programs running on one or more enterprise IT systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. In many cases, application programs used by a business enterprise are developed by a commercial software developer for sale to, and use by, many business enterprises.

An application program may be designed to meet the specific requirements of the environment in which the application program is operating. Some commercial application programs may be designed for use by many business enterprises that are in a particular industry or in a particular geographic region. In some cases, a more-generalized commercial application program may be modified for more specialized use by many business enterprises. Such modifications may be performed by the same business enterprise that developed the more-generalized commercial application program, or such modifications may be performed by a different business enterprise, which may be referred to as a "business partner" of the business enterprise that developed the more-generalized commercial application program. In some cases, modifications may be made to the application program to meet the specific requirements of business enterprises in a particular industry or a particular geographic region, or to meet the specific requirements of a particular business enterprise or a particular department in a business enterprise. Examples of such modification include customization of the data model, the process model, or the user interface of the application. Modification of an application program may require knowledge of the data model, the process model, and/or the user interface of the application program. Modification of an application program also may require knowledge of programming techniques used to develop the application program.

SUMMARY

Generally, the described techniques enable a user, such as a business analyst or a system administrator, to define data-transition rules that control how a handover component of a computer application transforms business objects of one type to business objects of another type. The handover component also may be called a business object transition service, a data-transition manager, a transition manager, a data-transition service, or a transition service. The handover component is logically situated between a preceding business process that generates (or uses) a preceding type of business object and a second business process that uses a second type of business object. In other words, the handover component controls data transition between two business processes. The preceding type of business object of the preceding business process may be referred to as a preceding business object, and the second type of business object of the second business process may be referred to as a succeeding business object. At runtime, the handover component receives the preceding business objects from the preceding business process of a computer application. Based on the user-defined data-transition rules, the handover component performs a split/merge process that determines the succeeding business objects to be generated based on the preceding business objects received from the preceding business process. The handover component then generates the succeeding business objects based on the received preceding business objects and the user-defined data-transition rules. To do so, the handover component transforms, or copies, the data from a preceding business object to the corresponding succeeding business object. In this manner, a customized process defined by user-defined data-transition rules is able to be performed by a computer application.

A handover component may be able to process different types of business objects and, as such, is able to operate in different business contexts that use different types of business objects. A handover component also may be able to operate across multiple computer applications (such as a customer relationship management (CRM) application or a supply chain management (SCM) application).

In one example, a handover component may be configured to determine the manner by which sales orders received from customers are combined into delivery orders. For example, one business enterprise may combine sales orders based on delivery location of a sales order, whereas another business enterprise may combine sales orders based on customer identity of a sale order. A handover component of a computer application used by the first business enterprise may be configured to combine sales orders based on delivery location, and the handover component of the computer application used by the second business enterprise may be configured to combine sales orders based on customer identity. In another example, a handover component may combine (or merge) sales orders based on a commonality of a shipping location and a delivery date. The handover component then generates delivery requests (or other type of delivery documents) that may be used by a warehouse fulfillment or packaging process. In this manner, a business enterprise is able to define the ways that sales orders are transformed into delivery requests.

A handover component also may be configured to separate (or split) items of a sales order for a customer based on delivery mode preferred for the ordered items. Some items in the sales order may be delivered using an express or premium delivery service, whereas other items in the sales order may be delivered using standard delivery. The items to be delivered using the express or premium delivery service are grouped into a first delivery order, and the items to be delivered using standard delivery methods are grouped into a second delivery order.

In one general aspect, data is transformed by receiving, from a preceding transaction process of a computer application, multiple transaction data entries of a preceding transaction type. A transaction data entry includes attribute values, and each attribute value corresponding to an attribute of the preceding transaction type. An indication of a processing transition point is received. User-defined configuration information that is associated with the indicated processing transition point is accessed. The configuration information identifies information related to how to generate a transaction data entry of a succeeding transaction type based on the preceding transaction type. The configuration information also identifies information related to how to transform an attribute of the preceding transaction type to an attribute of the succeeding transaction type. The accessed configuration information is used to determine transaction data entries of a succeeding transaction type that are to be generated based on the multiple transaction data entries of the preceding transaction type.

Implementations may include one or more of the following features. For example, a transaction data entry of the succeeding transaction type may be generated based on one or more of the multiple transaction data entries of the preceding transaction type. An attribute value of one of the one or more of the multiple transaction data entries of the preceding transaction type may be transformed to an attribute value of the generated transaction data entry of the succeeding transaction type. The generated transaction data entry of the succeeding transaction type may be provided to a second transaction process of the computer application able to process transaction data entries of the succeeding transaction type.

An attribute value of one of the one or more of the multiple transaction data entries of the preceding transaction type may be copied to an attribute value of the generated transaction data entry of the succeeding transaction type. An attribute value may be stored in the generated transaction data entry of the succeeding transaction type. The stored attribute value may be different from a corresponding attribute value of a transaction data entry of the preceding transaction type that was used to generate the generated transaction data entry. The preceding transaction process and the second transaction process may form an integrated computing process of the computer application.

Generating of a transaction data entry, transforming an attribute value of preceding transaction type to an attribute value of an attribute of the succeeding transaction type, and providing the generated transaction data entry may be repeated until all of the multiple data transaction entries have been processed. The number of generated transaction data entries of the succeeding transaction type may be less, or may be more, than number of multiple transaction data entries of the preceding transaction type.

The preceding transaction type may be different than the succeeding transaction type. Information related to how to generate a transaction data entry of a succeeding transaction type may be related to commonality among attribute values of transaction data entries. User-defined configuration information may be received that identifies 1) a processing transition point for the preceding transaction process and a succeeding transaction process, 2) information related to how to generate a transaction data entry of a succeeding transaction type used by the succeeding transaction process and based on the preceding transaction type, and 3) information related to how to transform an attribute of the preceding transaction type to an attribute of the succeeding transaction type. The received configuration information may be stored for later-use.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

Figure 1:
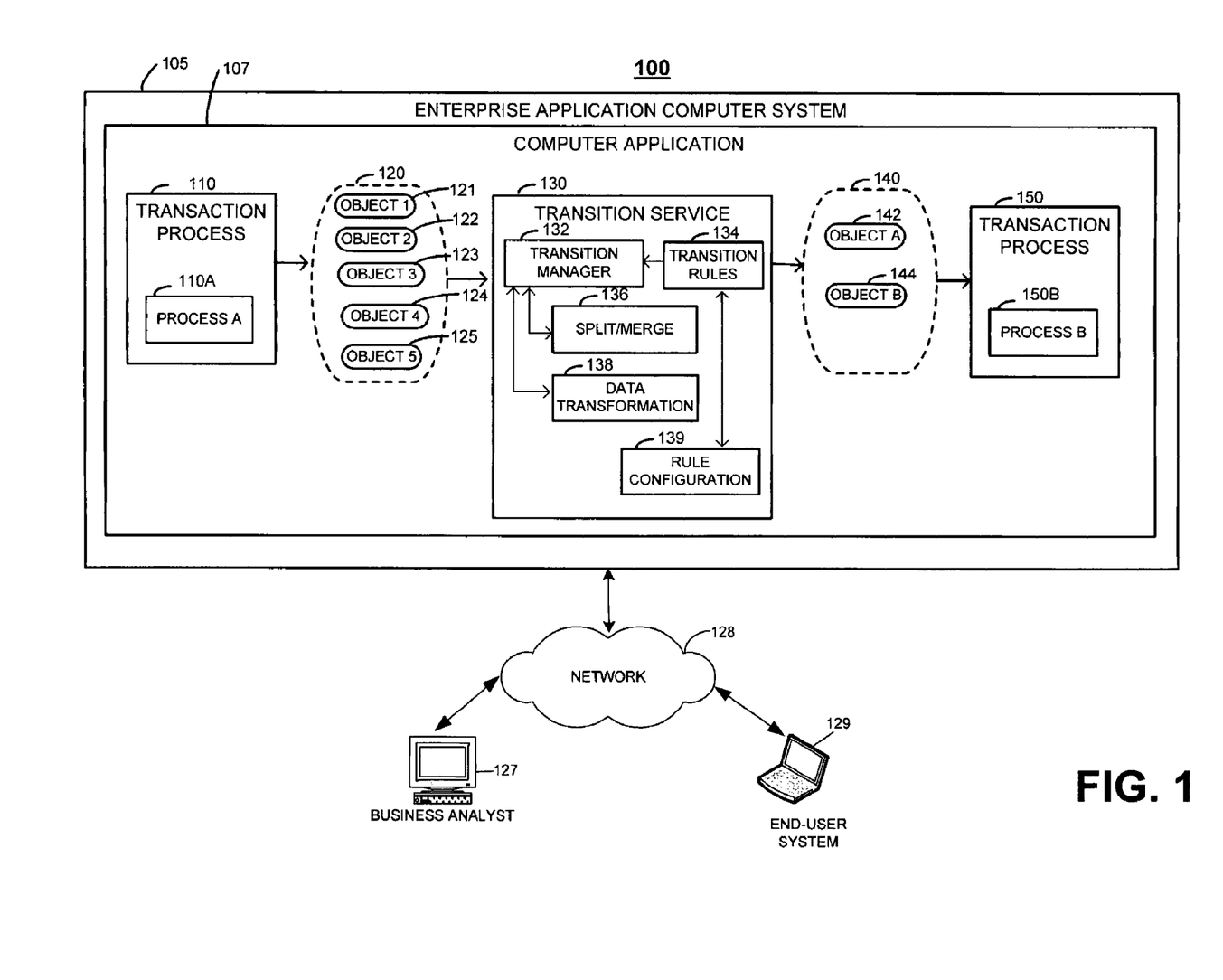
FIG. 1 is a block diagram of a system incorporating various aspects of the invention.

FIG. 1 shows a block diagram of a system 100 of networked computers, including an enterprise application computer system 105 capable of operating a computer application 107. In general, a user, such as a business analyst or a systems administrator, uses a computer system 127 to access the computer system 105 over a network 128 to configure a transition service 130 to transform business objects 120 produced by a transaction process 110 to business objects 140 capable of being used by a transaction process 150. At runtime, an end-user uses a computer system 129 to create and revise business objects 120 (or other types of application data) that are transformed by the transition service 130 to the business objects 140.

More particularly, the enterprise information technology (IT) system 100 includes the computer systems 110, 127 and 129, all of which are capable of executing instructions on data and all of which are interconnected via the network 128. Examples of the network 128 include the Internet, wide area networks (WANs), local area networks (LANs), or any other wired or wireless network. The business analyst system 127 and the end-user system 129 each may be a general-purpose computer that is capable of operating as a client of the computer application 107 (such as a desktop personal computer, a workstation, or a laptop computer running an application program), or a more special-purpose computer (such as a device specifically programmed to operate as a client of the particular computer application 107). For brevity, FIG. 1 illustrates only a single business analyst system 127 and a single end-user system 129 for system 100. However, actual implementations may include multiple business analyst computer systems and multiple end-user computer systems.

The computer system 105 may be a general-purpose computer or a special-purpose computer. The computer system 105 includes a computer application 107 having a transaction process 110 having instructions 110A for a process (i.e., process A) that generates or modifies business objects 121-125 (collectively, business objects 120). A business object is a particular portion of application data 125. Each business object 121-125 is a collection of data attribute values, and may be associated with a principal entity represented in a computing device or a computing system. Examples of a business object include information about a customer, an employee, a product, a business partner, a product, a sales invoice, and a sales order. Business objects associated with a principal entity may be referred to as master data. Some implementations make a distinction between a master data object that refers to a principal entity and a transaction object that refers to a master data object. For example, a sales order object may be a transaction object that refers to a customer object, a type of master data object. Another example of a business object includes a party or entity (such as a recipient, a sold-to-party, a payer or a responsible party). A party may be a business partner, though a party need not necessarily be a business partner. Examples of a business object also include a location, a product, a quantity, a reference document (such as a sales order, a sales invoice or a delivery order), and a status of an item, a document or a process, a product.

A business object may be stored as one or more rows in one or more relational database tables, an object instance or instances in an object-oriented database, data in one or more extensible mark-up language (XML) files, or a record or records in one or more data files. Attributes are associated with a business object. In one example, a customer business object may be associated with a series of attributes including a customer number uniquely identifying the customer, a first name, a last name, an electronic mail address, a mailing address, a daytime telephone number, an evening telephone number, date of first purchase by the customer, and date of the most recent purchase by the customer. In another example, a sales order business object may include a customer number of the purchaser, the date on which the sales order was placed, and a list of products, services, or both products and services purchased. In yet another example, a return request business object may include a customer number of the purchaser, an item number of the purchased item that the customer wishes to return, date on which the request was received, and an indication whether the return request was approved.

In some implementations, a business object may refer to another business object. A business object that refers to another business object may be called a referring business object or a dependent business object. The referring object also may be called a sub-component of a business object. The business object to which the referring business object refers may be called a parent business object, and the referring business object may be called a child business object. For example, an employee object may be associated with a series of attribute values (such as first name, last name, and employee identification number) and may be related to two telephone-number referring objects (that each are associated with a particular telephone number) and a work-address referring object (that is associated with address attribute values, such as street address, city, state, zip code, and country).

The computer system 105 also includes a transition service 130 that transforms business objects 120 to business objects 140 for use by the transaction process 150 having instructions 150B for a process (i.e., process B). More particularly, the transition service 130 transforms business objects 121-125 of a first business object type to business objects 142 and 144 of a second business object type.

The transition service 130 includes instructions 132 for a transition manager that uses data-transition rules 135 to control the manner of transforming business objects 121-125 to business objects 142 and 144. The data-transition rules 135 also may be referred to as transition rules 135. The transition service 130 also includes instructions 136 for a split/merge process that determines how to re-structure business objects (here, business objects 120) of one type to business objects (here, business objects 140) of another type. The split/merge process 136 also may be referred to as a split/merge service. The split/merge process 136 determines the business objects of the second type that are to be generated from the business objects of the first type. In the case of a merge, the split/merge process 136 determines which of the preceding business objects share commonality among attribute values of one or more attributes. The split/merge process 136 also determines a business object of the succeeding business object type is to be generated for each group of preceding business objects that share the identified commonality. By contrast, in the case of a split, the split/merge process 136 determines the business objects of the succeeding business object type that are to be generated for each preceding business object.

The transition service 130 also includes instructions 138 for a data transformation process that maps attributes in the received business object type to attributes in the produced business object type. The transition service 130 also includes instructions 130 for displaying and controlling a user interface that enables a business analyst using the computer system 129 to define transition rules 135 for re-structuring business objects and mapping attributes from one business object type to another business object type.

In this example, the transition service 130 may merge business objects 121, 122 and 125 into business object 142 and may merge business objects 123 and 124 into business object 144. The business objects 142 and 144 may be provided to, or accessed by, the transaction process 150. In this manner, the transition service 130 may use user-defined rules to control the transformation of business objects 120 generated or used by the transaction process 110 to business objects 140 that are capable of being used by transaction process 150.

A transition service that includes a split/merge service that is able to be called or initiated independently of calling or initiating a data transformation service may be useful. For example, a split/merge service may be used to verify whether user-entered definition of succeeding objects to be generated from a set of preceding objects is correct. This may allow a transition service to check whether user-definition of succeeding objects conforms to split/merge rules of the transition service.

Similarly, it may be useful to initiate or call a data transformation service without first calling the split/merge service 136. For example, a data transformation service may receive attribute mapping information from a calling computer program or from user input and use the received mapping information to perform the identified data transformation. In another example, a data transformation service may be used to verify whether succeeding objects created from a set of preceding objects correctly mapped the attribute values from the preceding objects to the attributes of the succeeding objects without necessarily applying the split/merge structuring rules used by the split/merge service. The separation of the split/merge service 136 and the data transformation service 138 may help to increase flexibility of applying the tool.

In the example of FIG. 1, the transaction process 110 may be referred to as preceding transaction process, and the transaction process 150 may be referred to as a succeeding or successor transaction process. As such, the preceding transaction process 110 is executed prior to the succeeding transaction process 150 with respect to the transition service 130 transformation of the business objects 120 to business objects 140. In other words, an integrated computing process of the computer application 107 includes executing the preceding transaction process 110 before the transaction process 150 is executed for a series of objects.

In some implementations, a messaging service (such as a middleware application or service) may be used. For example, the transaction process may send the objects 120 to the transition service 130 via a middleware application, and the transition service 130 may send the objects 140 to the transaction process 150 via a middleware application. Additionally or alternatively, a workflow application or a business process management application may be used to facilitate sending the objects 120 from the transaction process 110 to the transition service 130 and/or facilitating sending the objects 140 from the transition service 130 to the transaction process 150.

The computer application 107 may be a commercial computer application that is developed and licensed (or sold) by a commercial software developer that is different from the business entity that uses the system 100. In some implementations, the transaction process 110 and the transaction process 150 may part of different computer applications. Some or all of the transaction processes 110 and 150 and the transition service 130 may be logically or physically decoupled. In one example, each of the transaction processes 110 and 150 and the transition service 130 may be located on separate computer systems, including computer systems that are in distinct locations and connected via a communication network, such as the network 128. In another example, the transaction processes 110 and 150 may be located on one computer system, and the transition service 130 may be located on another computer system. In yet another example, the transaction process 110 and the transition service 130 may be located on one computer system, and the transaction process 150 may be located on another computer system.

For brevity, FIG. 1 illustrates using a single computer system 105 that is accessed both by business analysts for configuring the transition service 130 and by end-users for using the application program 107 to operate on transaction data. However, actual implementations may include a computer system to configure the transition service 130 and one or more other computer systems to operate the application program 107 to process transaction data.

Figure 2:
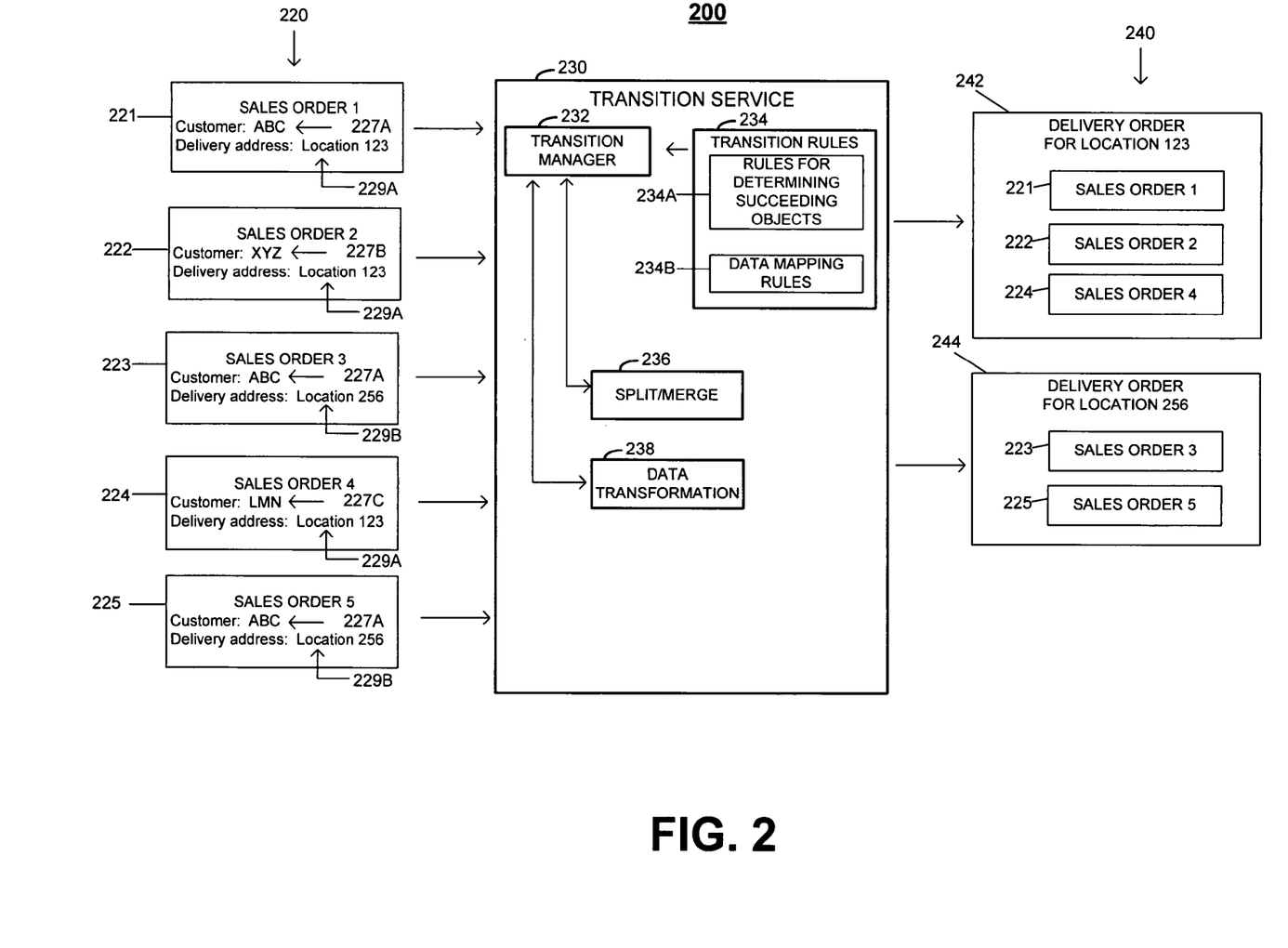
FIG. 2 is a block diagram of an example a transition service transforming a first type of business object into a second type of business object for use by a subsequent business process of a computer application.

FIG. 2 shows an example 200 of a transition services 230 transformation of business objects 221-225 (collectively, business objects 220) produced by a preceding transaction process in a computer application to business objects 242 and 244 (collectively, business objects 240) for use by a succeeding transaction process of the computer application. For brevity, the structure and arrangement of FIG. 2 is based on the structure and arrangement of FIG. 1. As would be recognized by one skilled in the art, however, the components and processes of FIG. 2 need not be the same as those described with respect to FIG. 1, nor are the techniques described with respect to FIG. 2 limited to being performed by the structure and arrangement illustrated by FIG. 2.

More particularly, each of business objects 221-225 represents a sales order identifying a customer and a delivery-address. Each of business objects 221-225 is of the business object type of a sales order. As such, each business object may be referred to as a sales order object, and the business object type may be referred to as a sales order type. The sales order type includes a customer attribute and a delivery-address attribute. For brevity, the sales order type includes only the customer attribute and the delivery-address attribute. Actual implementations may include additional attributes.

Each of business objects 221-225 includes a customer attribute value and a delivery-address attribute value. More particularly, each of sales objects has a customer attribute value 227A, 227B, 227A, 227C or 227A and a delivery-address attribute value 229A, 229A, 229B, 229A or 229B, respectively. As shown, sales objects 221, 223 and 225 include the customer attribute value 227A (i.e., "ABC"). Sales objects 221, 222 and 224 include delivery-address attribute value 229A (i.e., "Location 123"), whereas sales objects 223 and 225 include the delivery-address attribute value 229B (i.e., "Location 256"). A delivery-address attribute value 229A or 229B need not necessarily be a street address. For example, a delivery address 229A or 229B may represent a geographic area or delivery area to help identify sales orders that may be grouped together in a delivery order.

The transition manager 232 process of the transition service 230 receives sales orders 220 and accesses transition rules 234 for sales order objects. More particularly, the transition manager 232 accesses rules 234A for determining succeeding delivery-order objects from sales order objects. The rules 234A identify one or more attributes of a sales object for which commonality of attribute values signals the sales objects are to be merged into a single delivery object. Here, the rules 234A identify that sales objects having a common or complimentary delivery-address attribute value are to be merged into a single delivery document. The transition manager 232 also accesses rules 234B for mapping data from a sales order object to a delivery-order object.

The transition manager 232 calls a split/merge process 236 with rules 234A for determining succeeding objects and indications of the sales orders 220. The split/merge process 236 uses the rules 234A to determine that two delivery orders are to be generated based on the sales objects 220. More particularly, the split/merge process 236 determinates that one delivery order is to be generated for delivery-address attribute value 229A (i.e., "Location 123"), and sales orders 221, 222 and 224 are to be included in that delivery order. The split/merge process 236 also determines that a second delivery order is to be generated for delivery-address attribute value 229B (i.e., "Location 256"), and sales orders 223 and 225 are to be included in that second delivery order. The split/merge process 236 returns the indication of the delivery orders to the transition manager 232. The split/merge process 236 may return an indication of the grouping of preceding objects into succeeding objects (for a merge process). Alternatively, the split/merge process 236 may return an indication of the succeeding objects to be generated for each preceding object. Additionally or alternatively, the split/merge process 236 may return the number of succeeding objects to be created.

The transition manager 232 then calls a data transformation process 238 with rules 234B for mapping attributes from a sales order to attributes in a delivery order. The data transformation process 238 generates delivery order 242 that includes attribute values from sales orders 221, 222 and 224 and generates delivery order 244 that includes attribute values from sales orders 223 and 225.

In one example, sales orders may be merged to generate a delivery document that is used by a warehouse application to guide the loading of a delivery truck or otherwise guide packaging for shipping or delivery. This may help increase delivery efficiency. Similarly, sales orders may be merged before sending sales orders to warehouse for processing. This may help increase efficiency of packaging orders at a warehouse.

In another example, a sales order may have some items that are ready to ship and other items that are not yet ready to ship—that is, for example, some items may be backordered. The items that are ready to ship are separated (split) from items that are backordered. A delivery order is prepared for the items that are ready to ship, and a different delivery order is prepared for items that are backordered.

In yet another example, it may be useful to combine multiple shipping orders of goods from the same vendor into a single inbound-delivery request. The inbound-delivery request may be used to confirm delivery of the multiple shipments to the vendor.

Figure 3:
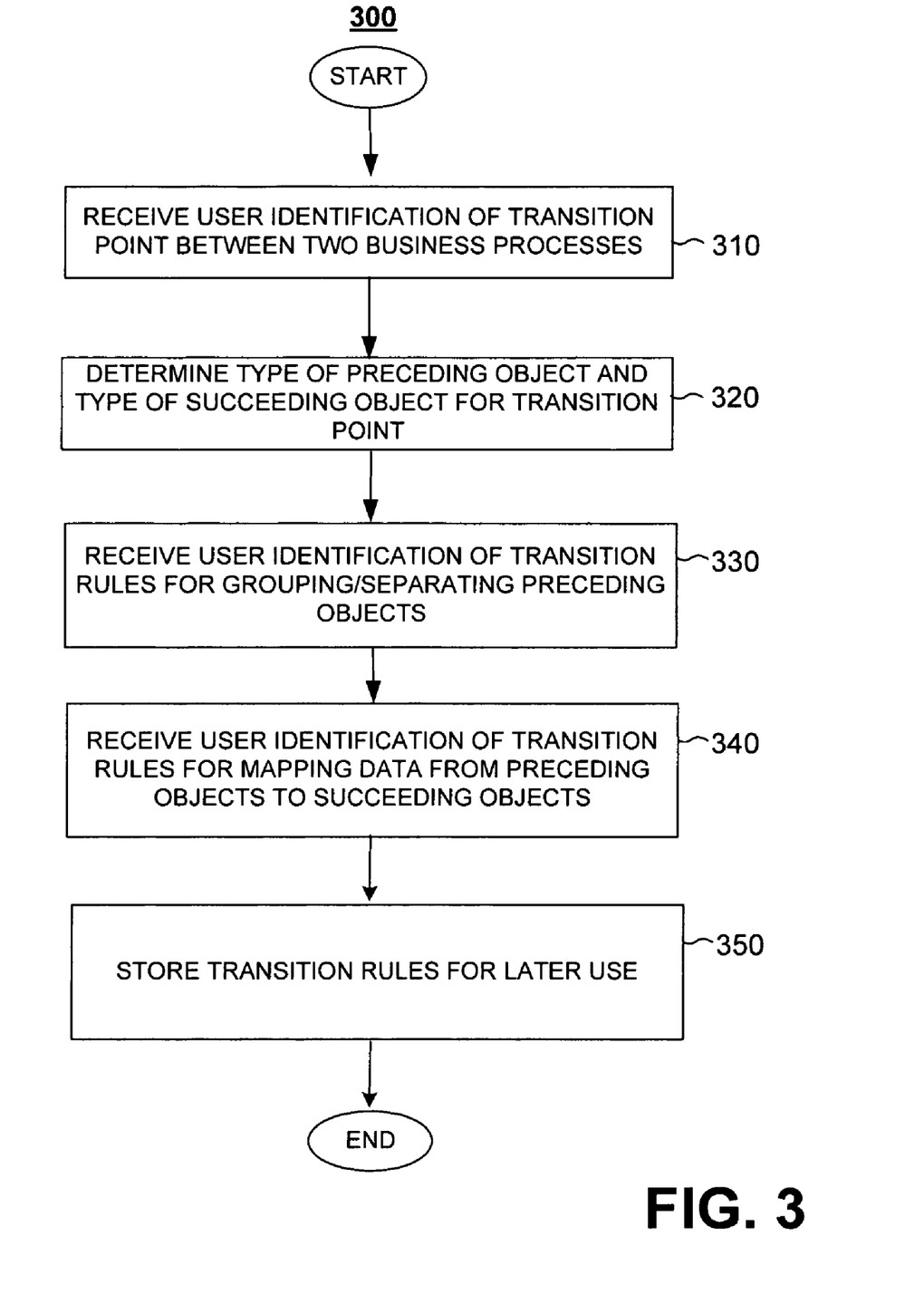
FIG. 3 is a flow chart of a process for defining rules to control a transition service.

FIG. 3 illustrates a process 300 for defining transformation of a business object produced by a first transaction process to business objects capable of being used by a second transaction process. The process 300 may be performed by one or more processors in a system, such as, for example, the computer system 105 in FIG. 1. The processor is directed by a method, script, or other type of computer program that includes instructions for performing the process 300. Examples of such a collection of instructions include the instructions 139 for configuration of the transition service 130 in FIG. 1. The process 300 may be manually initiated by a business analyst, system administrator or another type of user who desires to define how business objects of one type produced from a first business process are transformed to business objects of another type used by a second business process for later execution at runtime.

The processor receives user identification of a transition point between two business processes (step 310). This may be accomplished, for example, when the processor receives a user selection of a preceding transaction process and a successor transaction process. In some implementations, the user may select a preceding transaction process in combination with a successor transaction process (e.g., a single selection option indicates both a particular preceding transaction process and a particular successor transaction process). One such example is a selection of one of multiple pre-configured transition points, where each transition point identifies preceding transaction process and a particular successor transaction process. In another example, selection of a transition point identifies a preceding business object type and a succeeding business object type in addition to, or in lieu of, the identification of a particular preceding transaction process and a particular successor transaction process. In yet another example, a user may select a preceding process from a list of preceding processes and may select a successor process from a list of successor processes. In any event, the processor receives an identification of a transition point.

The processor determines the type of preceding object associated with the preceding business process and a type of succeeding object associated with the succeeding business process (step 320). To do so, for example, the processor may look-up the object type used by a particular transaction process by accessing a database table, a list or other type of data structure that associates an object type with a transaction process. In another example, the instructions executed by the processor may include an association of an object type with a transaction process.

The processor receives user identification of transition rules for grouping (merging) or separating (splitting) preceding objects (step 330). In one example, transition rules may indicate that sales orders are to be grouped based on shipping date, based on common location or locations within a user-entered or predetermined distance of one another, and based on customer identity when if shipping date is within a user-entered or predetermined number of days of another sales order for the customer. In another example, the processor may receive a user selection from a presented list of rules that may be associated with a particular object type or a particular transaction process. In a more particular example, a user may select from a list of attributes that are associated with a preceding object to define a rule based on commonality of attribute values for the selected attribute.

The processor receives user identification of transition rules for mapping data from preceding objects to succeeding objects (step 340). This may be accomplished, for example, when the processor displays a list of attributes of each object type and enables a user to indicate a data mapping between an attribute, as described more fully later.

The processor stores transition rules in association with the identified transition point between two business processes (step 350). For example, the processor may store the transition rules in transition rules 134 in FIG. 1 or in transition rules 234 in FIG. 2.

Figure 4:
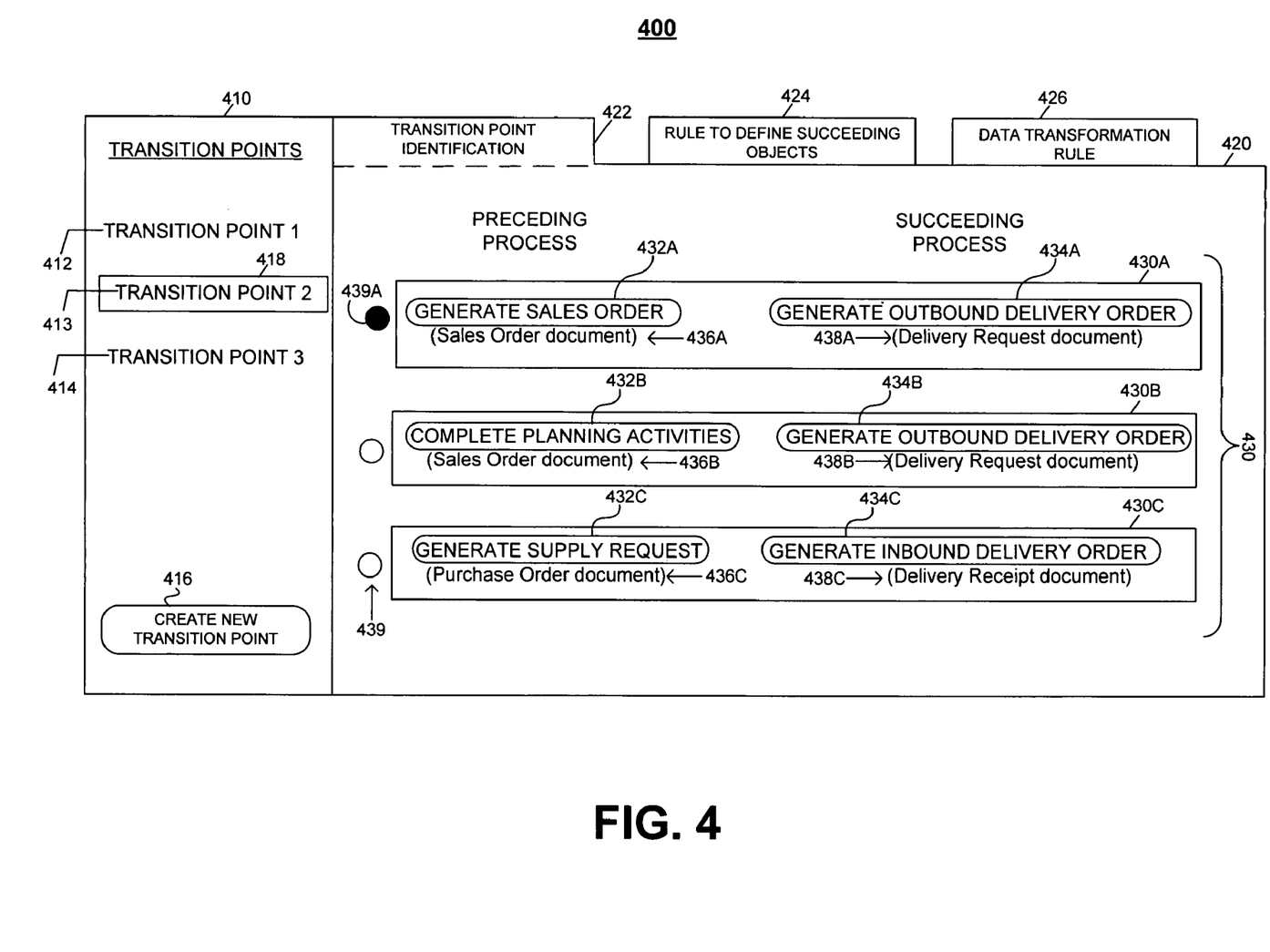
FIGS. 4-6 are block diagrams of an example user interface for defining and viewing rules to control a transition service.
Figure 5:
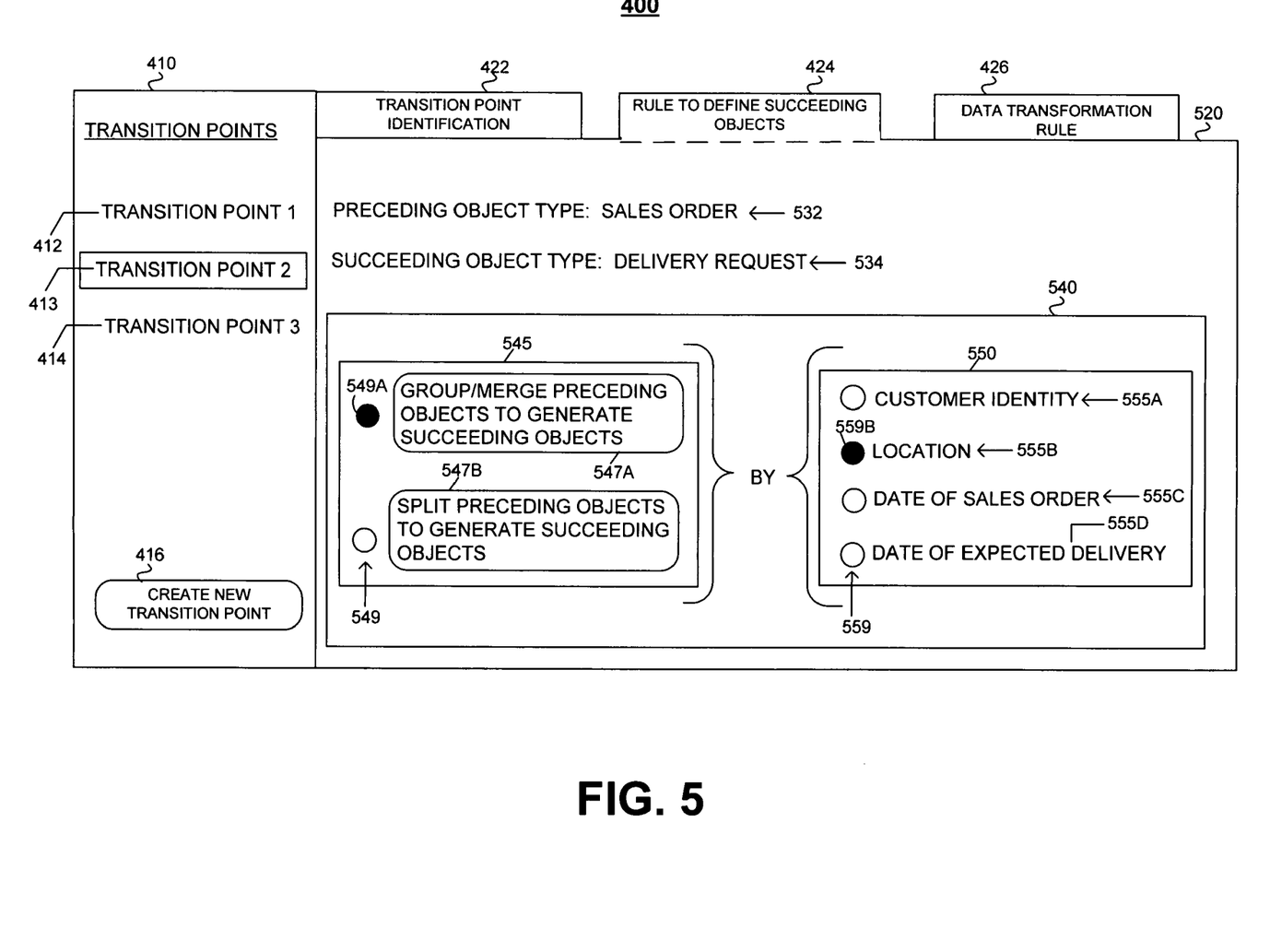
Figure 6:
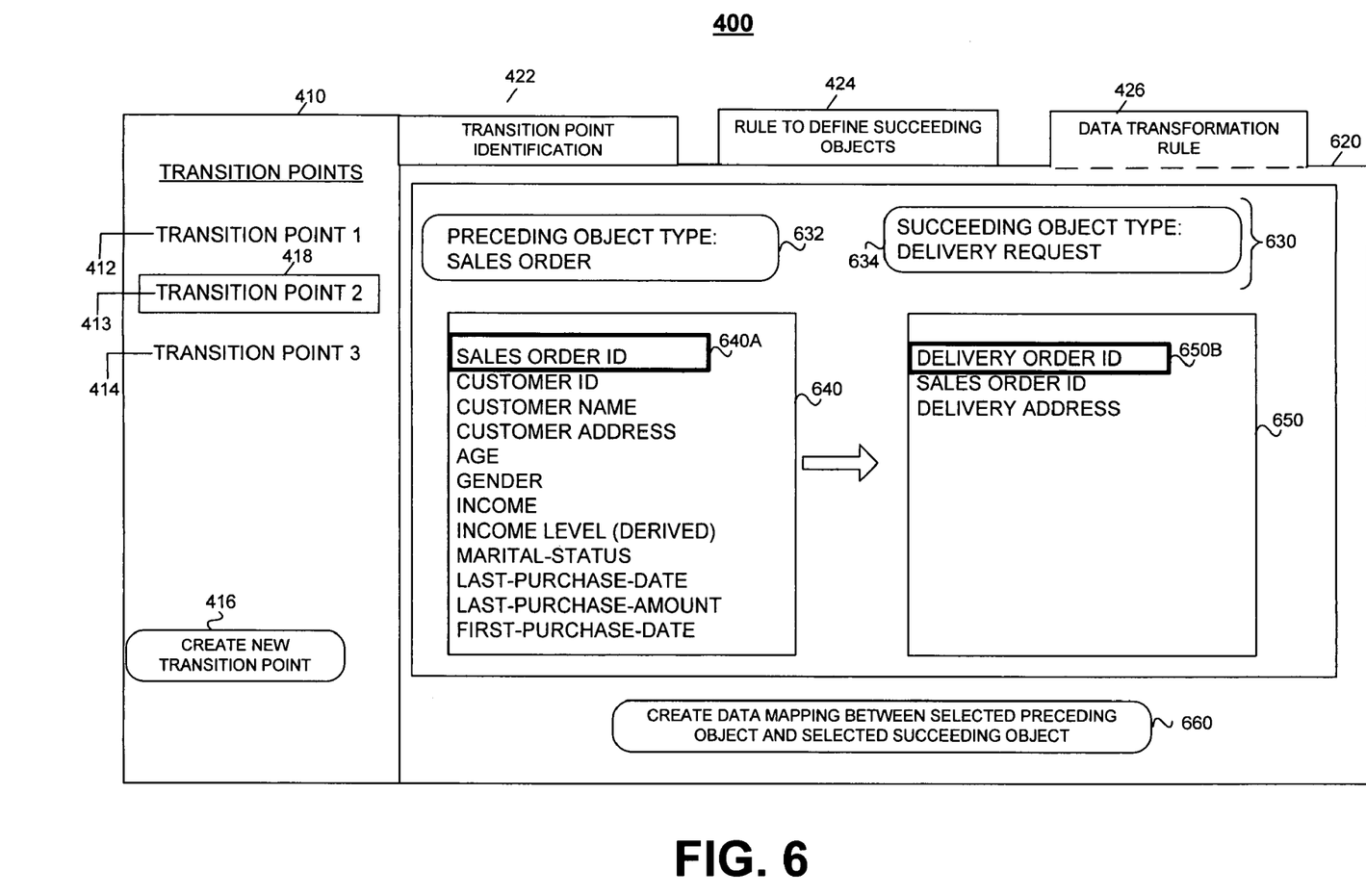

FIGS. 4-6 illustrate examples of a user interface 400 that may be displayed to a user who is defining transition rule for a transition service. The user interface 400 includes a transition point window 410 that displays transition points 412-414 that have been defined for a transition service. The transition point window 410 also includes a control 416 for initiating a process to create a new transition point, as described more fully below. In the illustration of the user interface 400, transition point 413 is selected, as illustrated by the box 418 used to highlight the selected transition point 413.

The user interface 400 also includes a transition-point-identification window 420 that displays information related to the particular transition point highlighted in the transition point window 410. The user indicates that the transition-point-identification window 420 is to be displayed by activating the transition-point-identification tab control 422, which may be accomplished by clicking on the transition-point-identification tab control 422 with a pointing device. In contrast, when a user selects the rule-to-define-succeeding-objects tab control 424, a succeeding-objects window 520 is displayed, as illustrated in FIG. 5 and described more fully below. When a user selects the data-transformation-rule tab control 426, a data-transformation-rule window 620 is displayed, as illustrated in FIG. 6 and described more fully below.

The transition-point-identification window 420 includes a list 430 of selectable preceding and succeeding process pairs 430A, 430B and 430C. Each process pair 430 identifies a preceding process 432A, 432B or 432C and a succeeding process 434A, 434B or 434C of a computer application for which a transition point may be defined by a user. For each preceding process 432A, 432B or 432C, a document type 436A, 436B or 436C, respectively, is identified. The document type corresponds to the type of business object generated or used by the preceding process and may help a user select one of the pairs 430. Similarly, a document type 438A, 438B or 438C used by each of the succeeding processes 434A, 434B or 434C, respectively, is displayed. Each of the pairs 430 may be selectable using one of the controls 439. In the example of user interface 400, pair 430A is selected with control 439A. For brevity, FIG. 4 illustrates only three preceding-succeeding process pairs 430A, 430B and 430C. However, actual implementations may include many preceding-succeeding process pairs.

Referring also to FIG. 5, the user interface 400 includes succeeding-objects window 520. The display of the succeeding-objects window 520 is controlled through the selection by a user of the succeeding-objects tab control 424.

The succeeding-objects window 520 identifies the preceding object type 532 (here, sales order) and the succeeding object type 534 (here, delivery request) for the transition point 413 selected in the transition-point window 410. The succeeding-objects window 520 also includes an object rule window 540 that enables a user to identify, in options window 545, whether a merge process or a split process is to be performed. Each of the merge option 547A and the split option 547B may be selectable using one of the controls 549. In the example of user interface 400, merge option 547A is selected with control 549A.

The object rule window 540 also enables a user to identify, in window 550, the basis on which preceding objects are to be grouped together as a succeeding object (when option 547A is selected) or the basis on which a preceding object is to be divided into multiple succeeding objects (when option 547B is selected). To do so, multiple options 555A-555D of attributes of the preceding object type may be selected using controls 559 and used as a basis for splitting or merging preceding objects commonality among attribute values. As shown by the selection of control 559B and control 549A for merge option 547A, attribute 555B is selected as a basis for merging preceding objects.

Referring also to FIG. 6, the user interface 400 includes data-transformation-rule window 620. The display of the data-transformation-rule window 620 is controlled through the selection by a user of the data-transformation-rule tab control 426. The transformation-rule window 620 identifies the preceding object type 632 (here, sales order) and the succeeding object type 634 (here, delivery request) for the transition point 413 selected in the transition-point window 410.

As one example, the data-transformation-rule window 620 displays attributes 640 of the preceding object type 632 and attributes 650 of the succeeding object type 634. This illustrates how a user may identify data mapping between attributes in preceding object type and attributes in a succeeding object type. One of the attributes 640 of the preceding object type 632 may be selected, as may one of the attributes 650 of the succeeding object type 630. As shown, attribute 640A of the attributes 640 of the preceding object type is selected, and attribute 650A of the attributes 650 of the succeeding object type is selected. The data-transformation-rule window 620 also includes a control 660 operable to create a data mapping relationship between the selected attribute in the preceding object type and the selected attribute in the succeeding object type. As illustrated, attribute may represent an attribute in the preceding object type and corresponding attributes values in a business object of the type may be copied to the business object of the succeeding object type. In some implementations, the attribute may represent a meta-data attribute that describes one or more attributes in the preceding object type or the succeeding object type. Some implementations may enable a user to identify a computer program, function, method or other type of business process instructions that transform attributes of the preceding object type to corresponding attributes in the succeeding object type.

A user may repeatedly create data mapping relationships between various attributes in the preceding object type and the succeeding object type until all of the attributes to be included in a succeeding object have been identified.

Figure 7:
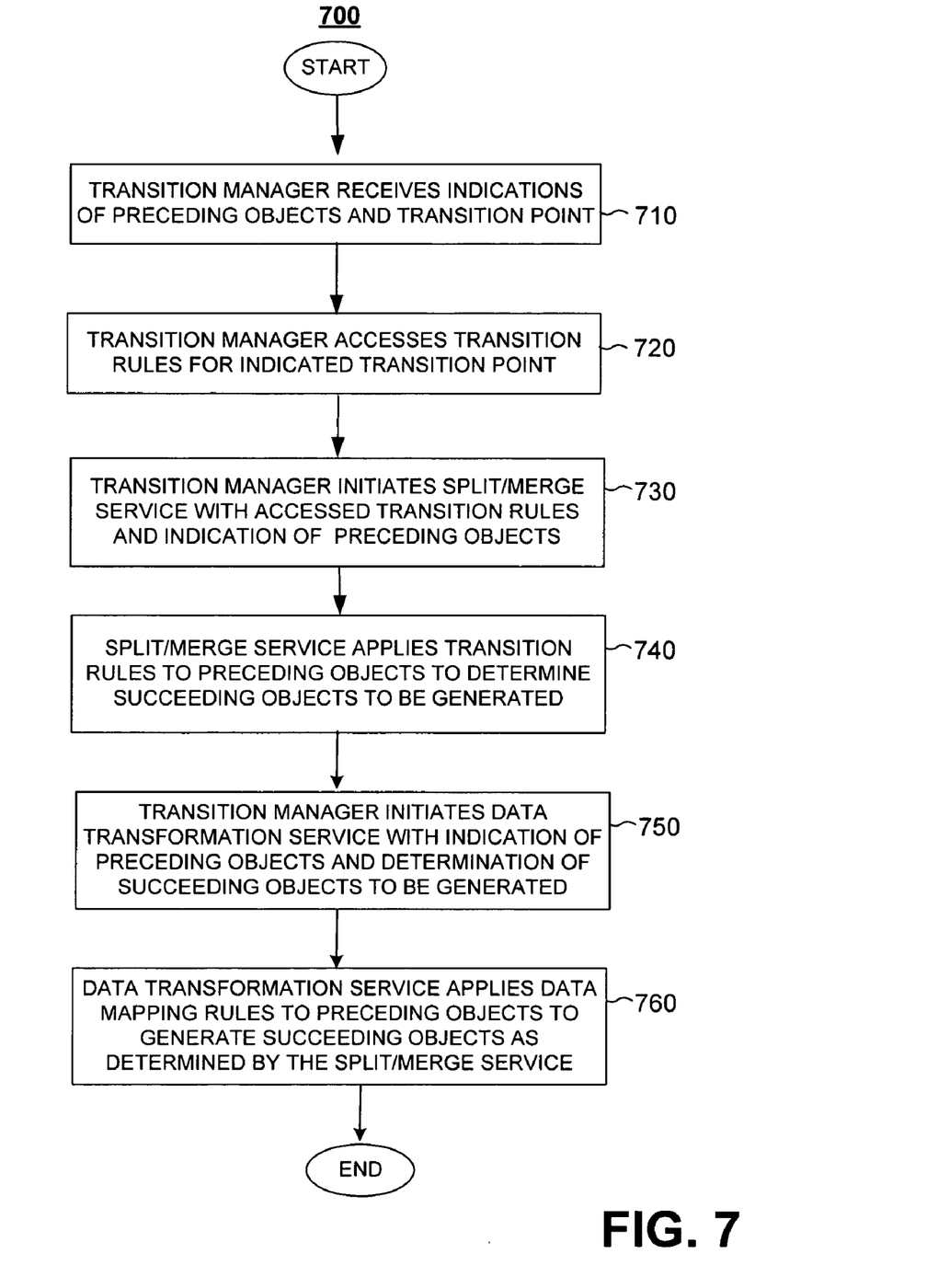
FIG. 7 is a flow chart of a process for executing a user-defined data transition process to transform business objects of a first type to business objects of a second type that are able to be used by a second business process.

FIG. 7 illustrates a process 700 for executing a handoff process defined by a user to transform business objects of a first type and produced by a first business process to business objects of a second type that are able to be used by a second business process. The process 700 may be performed by one or more processors in a system, such as, for example, the computer system 110 of FIG. 1. The processor is directed by a method, script, or other type of computer program that includes executable instructions for performing the process 700. Examples of such a collection of instructions include the transition service 130 having instructions 132 for a transition manager, instructions 136 for a split/merge process and instructions 138 for data transformation, all of FIG. 1 controlled by transition rules 134 defined by a business analyst, system administrator or another type of user. The process 700 is performed for the one or more business objects (such as particular sales order or particular return requests) that resulted from, or was processed by, the first business process.

The process 700 may be initiated by a message sent to the transition service. For example, a business process monitor (or other type of executing computer program) may scan communications for trigger event, and, when trigger event observed, the business process monitor may call the transition service. The process 700 also may be initiated when a user clicks a button on user interface to initiate the transition service. In another example, the process 700 may be initiated asynchronously. For example, a request for transition service received programmatically or through user-entry may be stored and later-used to initiate the transition service. In this way, multiple requests for transition services may be processed periodically, such as on a predetermined schedule or in response to user activation of a transition-service control or menu item to initiate a transition service.

The transition manager receives an indication (or indications) of preceding objects and transition point (step 710). This may be accomplished, for example, when the transition manager receives a list of object identifiers and an identifier of a transition processing point. By way of example, when the transition service is called, the transition manager may be passed a list of object identifiers and an identifier of a transition point between a preceding transaction process and a succeeding transaction process. In some implementations, if a type of preceding object is associated only with one transition point, the transition manager may receive an indication of the preceding objects and determine the transition point based on the type of preceding objects received. Additionally or alternatively, the transition manager may receive the preceding objects themselves (rather than a list of object identifiers).

The transition manager accesses transition rules for the objects received and the transition point (step 720). The accessed transition rules may include, for example, rules for determining succeeding objects and/or data mapping rules for copying or transforming attributes from preceding objects to attributes in succeeding objects.

The transition manager calls a split/merge service with the accessed transition rules and indication of preceding objects (step 730). This may be accomplished, for example, by calling a split/merge service and passing to the split/merge service parameters for identifiers of the preceding objects and accessed transition rules.

The split/merge service applies the transition rules to the preceding objects to determine succeeding objects to be generated (step 740). This may be accomplished by identifying attribute values that match for preceding object attributes identified the transition rule. In another example, processing logic may be applied to identify succeeding objects to be generated based on the received preceding objects. In such a case, for example, the transition rule may identify a computer program, module or other collection of instructions to apply to the preceding objects to determine succeeding objects to be generated. In some implementations, the split/merge service may determine the number of succeeding objects. Alternatively or additionally, the split/merge service may determine which of the preceding objects that are to be grouped or split into each succeeding object to the generated. The split/merge service may determine a succession object that is to be generated from a group of the preceding objects that is less than all of the preceding objects. The split/merge service returns an indication of the succeeding objects to be generated to the transition manager.

The transition manager initiates a data transformation service with indication of preceding objects and determination of succeeding objects to be generated (step 750). The data transformation service applies data mapping rules to preceding objects to generate succeeding objects as determined by the split/merge service (step 760). To do so, for example, the data transformation service may generate a succeeding object structure and copy attributes from multiple preceding objects, as indicated by the data mapping rules. The data transformation service also may generate multiple succeeding object structures and copy one or more attributes from a preceding object into each of the generated succeeding object structures. The attributes copied from the preceding object may be the same or different for each succeeding object.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results may be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in a computer-readable storage medium, the computer program product including instructions that, when executed, cause a data-transformation handling component to perform operations comprising:

receiving, from a preceding transaction process of a computer application, multiple transaction data entries of a preceding transaction type, wherein:
a transaction data entry includes attribute values, each attribute value corresponding to an attribute of the preceding transaction type,
the computer application includes instructions that, when executed, process transaction data that is applicable to many different business enterprises, and
the multiple transaction data entries include a first preceding transaction data entry having a first attribute value for a particular attribute and a second preceding transaction data entry having a second attribute value for the particular attribute, the first preceding transaction data entry being different from the second preceding transaction data entry;

receiving an indication of a processing transition point;

accessing user-defined configuration information that is associated with the indicated processing transition point, wherein the configuration information identifies 1) information related to how to generate a transaction data entry of a succeeding transaction type based on the preceding transaction type, and 2) information related to how to transform an attribute of the preceding transaction type to an attribute of the succeeding transaction type; and using the accessed configuration information to determine transaction data entries of a succeeding transaction type that are generated based on the multiple transaction data entries of the preceding transaction type, wherein:
conditioned on the first attribute value matching the second attribute value, the transaction data entries of the succeeding transaction type that are generated include a first succeeding transaction data entry including data based on the first preceding transaction data entry and the second preceding transaction data entry, and
conditioned on the first attribute value not matching the second attribute value, the transaction data entries of the succeeding transaction type that are generated include i) a first succeeding transaction data entry including data based on the first preceding transaction data entry and ii) a second succeeding transaction data entry including data based on the second preceding transaction data entry, the first succeeding transaction data entry being different from the second succeeding transaction data entry.

2. The computer program product of claim 1 wherein the instructions that, when executed, further cause the data-transformation handling component to perform operations comprising:

generating a transaction data entry of the succeeding transaction type based on one or more of the multiple transaction data entries of the preceding transaction type;

transforming an attribute value of one of the one or more of the multiple transaction data entries of the preceding transaction type to an attribute value of the generated transaction data entry of the succeeding transaction type; and providing the generated transaction data entry of the succeeding transaction type to a second transaction process of the computer application that processes transaction data entries of the succeeding transaction type.

3. The computer program product of claim 2 wherein transforming an attribute value comprises copying an attribute value of one of the one or more of the multiple transaction data entries of the preceding transaction type to an attribute value of the generated transaction data entry of the succeeding transaction type.

4. The computer program product of claim 2 wherein transforming an attribute value comprises storing an attribute value in the generated transaction data entry of the succeeding transaction type, wherein the stored attribute value is different from a corresponding attribute value of a transaction data entry of the preceding transaction type that was used to generate the generated transaction data entry.

5. The computer program product of claim 2 wherein the preceding transaction process and the second transaction process form an integrated computing process of the computer application.

6. The computer program product of claim 2 wherein the instructions that, when executed, further cause the data-transformation handling component to perform operations comprising repeating generating of a transaction data entry, transforming an attribute value of preceding transaction type to an attribute value of an attribute of the succeeding transaction type, and providing the generated transaction data entry until all of the multiple data transaction entries have been processed.

7. The computer program product of claim 6 wherein number of generated transaction data entries of the succeeding transaction type is less than number of multiple transaction data entries of the preceding transaction type.

8. The computer program product of claim 6 wherein number of generated transaction data entries of the succeeding transaction type is greater than number of multiple transaction data entries of the preceding transaction type.

9. The computer program product of claim 1 wherein the preceding transaction type is different than the succeeding transaction type.

10. The computer program product of claim 1 wherein information related to how to generate a transaction data entry of a succeeding transaction type based on the preceding transaction type comprises information related to commonality among attribute values of transaction data entries.

11. The computer program product of claim 1 further comprising instructions that, when executed, cause a configuration component to perform operations comprising:
receiving user-defined configuration information that identifies 1) a processing transition point for the preceding transaction process and a succeeding transaction process, 2) information related to how to generate a transaction data entry of a succeeding transaction type used by the succeeding transaction process and based on the preceding transaction type, and 3) information related to how to transform an attribute of the preceding transaction type to an attribute of the succeeding transaction type; and
storing the received configuration information for later-use by the data-transformation handling component.

12. A method for transforming data, the method comprising:
receiving, from a preceding transaction process of a computer application, multiple transaction data entries of a preceding transaction type, wherein:
 a transaction data entry includes attribute values, each attribute value corresponding to an attribute of the preceding transaction type,
 the computer application includes instructions that, when executed, process transaction data that is applicable to many different business enterprises, and
 the multiple transaction data entries include a first preceding transaction data entry having a first attribute value for a particular attribute and a second preceding transaction data entry having a second attribute value for the particular attribute, the first preceding transaction data entry being different from the second preceding transaction data entry;
receiving an indication of a processing transition point;
accessing user-defined configuration information that is associated with the indicated processing transition point, wherein the configuration information identifies 1) information related to how to generate a transaction data entry of a succeeding transaction type based on the preceding transaction type, and 2) information related to how to transform an attribute of the preceding transaction type to an attribute of the succeeding transaction type; and
using the accessed configuration information to determine transaction data entries of a succeeding transaction type that are generated based on the multiple transaction data entries of the preceding transaction type, wherein:
 conditioned on the first attribute value matching the second attribute value, the transaction data entries of the succeeding transaction type that are generated include a first succeeding transaction data entry including data based on the first preceding transaction data entry and the second preceding transaction data entry, and
 conditioned on the first attribute value not matching the second attribute value, the transaction data entries of the succeeding transaction type that are generated include i) a first succeeding transaction data entry including data based on the first preceding transaction data entry and ii) a second succeeding transaction data entry including data based on the second preceding transaction data entry, the first succeeding transaction data entry being different from the second succeeding transaction data entry.

13. The method of claim 12 further comprising:
generating a transaction data entry of the succeeding transaction type based on one or more of the multiple transaction data entries of the preceding transaction type;
transforming an attribute value of one of the one or more of the multiple transaction data entries of the preceding transaction type to an attribute value of the generated transaction data entry of the succeeding transaction type; and
providing the generated transaction data entry of the succeeding transaction type to a second transaction process of the computer application that processes transaction data entries of the succeeding transaction type.

14. The method of claim 13 wherein transforming an attribute value comprises copying an attribute value of one of the one or more of the multiple transaction data entries of the preceding transaction type to an attribute value of the generated transaction data entry of the succeeding transaction type.

15. The method of claim 13 wherein:
transforming an attribute value comprises storing an attribute value in the generated transaction data entry of the succeeding transaction type, and
the stored attribute value is different from a corresponding attribute value of a transaction data entry of the preceding transaction type that was used to generate the generated transaction data entry.

16. The method of claim 13 further comprising repeating generating of a transaction data entry, transforming an attribute value of preceding transaction type to an attribute value of an attribute of the succeeding transaction type, and providing the generated transaction data entry until all of the multiple data transaction entries have been processed.

17. The method of claim 16 wherein number of generated transaction data entries of the succeeding transaction type is less than number of multiple transaction data entries of the preceding transaction type.

18. The method of claim 16 wherein number of generated transaction data entries of the succeeding transaction type is greater than number of multiple transaction data entries of the preceding transaction type.

19. The method of claim 12 wherein information related to how to generate a transaction data entry of a succeeding transaction type based on the preceding transaction type comprises information related to commonality among attribute values of transaction data entries.

20. The method of claim 12 further comprising:
receiving user-defined configuration information that identifies 1) a processing transition point for the preceding transaction process and a succeeding transaction process, 2) information related to how to generate a transaction data entry of a succeeding transaction type used by the succeeding transaction process and based on the preceding transaction type, and 3) information related to how to transform an attribute of the preceding transaction type to an attribute of the succeeding transaction type; and
storing the received configuration information for later-use by the data-transformation handling component.

21. The computer program product of claim 1 wherein:
conditioned on the first attribute value matching the second attribute value, the first succeeding transaction data entry includes i) the particular attribute having an attribute value that matches the first and second attribute values, ii) a first succeeding attribute including a first succeeding attribute value that is based on information included in the first preceding transaction data entry, and iii) a second succeeding attribute including a second succeeding attribute value that is based on information included in the second preceding transaction data entry, the first succeeding attribute being different than the particular attribute and the second succeeding attribute being different than the particular attribute and the first succeeding attribute; and
conditioned on the first attribute value not matching the second attribute value, the first succeeding transaction data entry includes i) the particular attribute having an attribute value that matches the first attribute value and ii) a first succeeding attribute including a first succeeding attribute value that is based on information included in the first preceding transaction data entry, and the second succeeding transaction data entry includes i) the particular attribute having an attribute value that matches the second attribute value and ii) a second succeeding attribute including a second succeeding attribute value that is based on information included in the second preceding transaction data entry.

22. The computer program product of claim 1 wherein the computer program product includes instructions that, when executed, cause a data-transformation handling component to perform operations comprising:
based on the accessed configuration:
accessing the first attribute value from the first preceding transaction data entry;
accessing the second attribute value from the second preceding transaction data entry;
analyzing the first attribute value from the first preceding transaction data entry and the second attribute value from the second preceding transaction data entry;
based on the analysis, determining whether the first attribute value from the first preceding transaction data entry matches the second attribute value from the second preceding transaction data entry,
wherein using the accessed configuration information to determine transaction data entries of a succeeding transaction type that are generated based on the multiple transaction data entries of the preceding transaction type includes, based on determination results, determining transaction data entries of a succeeding transaction type that are generated based on the multiple transaction data entries of the preceding transaction type.

23. The computer program product of claim 22 wherein:
the multiple transaction data entries include a third preceding transaction data entry having a third attribute value for the particular attribute, the third preceding transaction data entry being different from the first preceding transaction data entry and the second preceding transaction data entry;
analyzing the first attribute value from the first preceding transaction data entry and the second attribute value from the second preceding transaction data entry includes analyzing the first attribute value from the first preceding transaction data entry, the second attribute value from the second preceding transaction data entry, and the third attribute value from the third preceding transaction data entry; and
based on the analysis, determining whether the first attribute value from the first preceding transaction data entry matches the second attribute value from the second preceding transaction data entry includes determining whether the first attribute value, the second attribute value, and the third attribute value match each other.

24. The computer program product of claim 23 wherein:
conditioned on a determination that the first attribute value matches the second attribute value and the third attribute value, the transaction data entries of the succeeding transaction type that are generated include a first succeeding transaction data entry including data based on the first preceding transaction data entry, the second preceding transaction data entry, and the third preceding transaction data entry,
conditioned on a determination that the first attribute value matches the second attribute value and does not match the third attribute value, the transaction data entries of the succeeding transaction type that are generated include i) a first succeeding transaction data entry including data based on the first preceding transaction data entry and the second preceding transaction data entry, and ii) a second succeeding transaction data entry including data based on the third preceding transaction data entry, the first succeeding transaction data entry being different from the second succeeding transaction data entry,
conditioned on a determination that the first attribute value matches the third attribute value and does not match the second attribute value, the transaction data entries of the succeeding transaction type that are generated include i) a first succeeding transaction data entry including data based on the first preceding transaction data entry and the third preceding transaction data entry, and ii) a second succeeding transaction data entry including data based on the second preceding transaction data entry, the first succeeding transaction data entry being different from the second succeeding transaction data entry, and
conditioned on a determination that the first attribute value does not match the second attribute value or the third attribute value and the second attribute value does not match the third attribute value, the transaction data entries of the succeeding transaction type that are generated include i) a first succeeding transaction data entry including data based on the first preceding transaction data entry, ii) a second succeeding transaction data entry including data based on the second preceding transaction data entry, and iii) a third succeeding transaction data entry including data based on the third preceding transaction data entry, the first, second, and third succeeding transaction data entries being different.

25. The computer program product of claim 1 wherein:
conditioned on the first attribute value matching the second attribute value, the transaction data entries of the succeeding transaction type that are generated only include the first succeeding transaction data entry including data based on the first preceding transaction data entry and the second preceding transaction data entry.

26. The computer program product of claim 1 wherein:
conditioned on the first attribute value matching the second attribute value, the transaction data entries of the succeeding transaction type that are generated do not include a second succeeding transaction data entry including data based on the second preceding transaction data entry.

* * * * *